(12) United States Patent
Ganser et al.

(10) Patent No.: US 9,297,992 B2
(45) Date of Patent: Mar. 29, 2016

(54) MICROSCOPE ILLUMINATION METHOD AND MICROSCOPE

(75) Inventors: Michael Ganser, Giessen (DE); Albrecht Weiss, Linden (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 915 days.

(21) Appl. No.: 13/559,778

(22) Filed: Jul. 27, 2012

(65) Prior Publication Data
US 2013/0027770 A1    Jan. 31, 2013

(30) Foreign Application Priority Data
Jul. 27, 2011    (DE) .......................... 10 2011 079 941

(51) Int. Cl.
| | |
|---|---|
| *G02B 21/10* | (2006.01) |
| *G02B 21/12* | (2006.01) |
| *G02B 21/08* | (2006.01) |
| *G02B 21/16* | (2006.01) |
| *G02B 5/22* | (2006.01) |

(52) U.S. Cl.
CPC ............ *G02B 21/088* (2013.01); *G02B 21/125* (2013.01); *G02B 21/16* (2013.01); *G02B 5/22* (2013.01)

(58) Field of Classification Search
CPC ....... G02F 1/01; G02F 1/0102; G02F 1/0105; G02F 1/1336; G02F 1/133603; G02F 1/133606; G02F 1/133609; G02F 1/133614; G02F 1/133621; G02F 1/133624; G02B 5/003; G02B 5/20; G02B 5/204; G02B 5/22–5/24; G02B 5/28; G02B 21/00; G02B 21/0004; G02B 21/0032; G02B 21/0064; G02B 21/06; G02B 21/10; G02B 21/12; G02B 21/125; G02B 21/14; G02B 26/00; G02B 26/007; G02B 26/008; G02B 26/02; G02B 2207/113

USPC ................. 600/321, 317, 160, 180, 181, 249; 359/362, 368, 385–390, 209.1, 227, 359/234, 236, 577, 580, 582, 588–590; 362/217.02, 217.08, 235, 239, 277, 362/282–284, 317, 319, 351; 353/84
See application file for complete search history.

(56) References Cited

U.S. PATENT DOCUMENTS

| | | | |
|---|---|---|---|
| 7,397,602 B2 * | 7/2008 | Endo ...................... | G02B 21/16 356/317 |
| 7,416,313 B2 * | 8/2008 | Westphal ............... | G02B 21/06 362/249.07 |

(Continued)

FOREIGN PATENT DOCUMENTS

DE      102007022666 A1      1/2008

*Primary Examiner* — Derek S Chapel
(74) *Attorney, Agent, or Firm* — Patentbar International, P.C.

(57) ABSTRACT

The invention relates to a microscope illumination method, to a microscope illumination set, comprising a white light LED (4) and a correction filter (6), and to a corresponding microscope system (1) for analyzing a sample (10) alternately or simultaneously in transmitted light bright field illumination and in incident light fluorescence illumination, wherein a white light LED (4) is used for the transmitted light bright field illumination, and a correction filter (6) is activated at a location in the illumination beam path of the transmitted light bright field illumination both during transmitted light bright field illumination and during incident light fluorescence illumination, wherein the correction filter (6) has a spectral transmission profile which has a minimum in the wavelength range of at least one maximum of the spectrum of the white light LED (4).

18 Claims, 4 Drawing Sheets

(56) References Cited

U.S. PATENT DOCUMENTS

| | | | | |
|---|---|---|---|---|
| 8,783,887 B2* | 7/2014 | Caruso | ............ | F21V 9/10 313/467 |
| 2004/0119086 A1* | 6/2004 | Yano | ............ | H01L 33/50 257/98 |
| 2007/0268575 A1* | 11/2007 | Yamazaki | ............ | G02B 23/2461 359/389 |
| 2009/0212242 A1* | 8/2009 | Yamada | ............ | G01N 21/6458 250/580 |
| 2011/0170181 A1* | 7/2011 | Yoshikawa | ............ | G02B 21/06 359/385 |

\* cited by examiner

MICROSCOPE ILLUMINATION METHOD AND MICROSCOPE

RELATED APPLICATIONS

This application claims priority to German Patent Application No. 10 2011 079 941.9, filed Jul. 27, 2011, which is incorporated herein by reference in its entirety.

FIELD OF THE INVENTION

The present invention relates to a microscope illumination method, to a microscope illumination means, comprising a white light LED and a correction filter, and to a corresponding microscope for analysing a sample, comprising transmitted light bright field illumination and incident light fluorescence illumination, which are switched on alternately or simultaneously.

BACKGROUND OF THE INVENTION

In cytodiagnostics and in pathology, stained samples are analysed by means of a microscope, generally in transmitted light bright field illumination. The colour of the microscopically analysed sample is an important criterion for diagnosis. In other microscopic analyses, for example by contrast methods such as phase contrast or differential interference contrast (DIC), the colour of the sample is of less significance. In contrast methods of this type, unstained samples are analysed, and appear predominantly transparent in transmitted light bright field microscopy. The contrast methods are subsequently used to make phase properties of the sample visible.

Fluorescence microscopy is a further known analysis method. In this context, the sample which is to be analysed is illuminated by means of an incident light illumination beam path, which passes through what is known as an excitation filter. The excitation light leads to fluorescences in the object which is stained with fluorochromes, the radiated fluorescence light determining the resulting microscope image of the sample. These microscopy methods have been known per se for a relatively long time. For further details, reference is made to the available prior art.

In the last few decades, halogen lamps have been used as the illumination means in the microscope, for example for transmitted light bright field illumination. The light which is emitted by the halogen lamp predominantly corresponds to the continuous spectrum of a black body. Generally, a thermal protection filter is also built into a lighting module comprising a halogen lamp, and greatly attenuates the infra-red range of the emitted radiation. An absorption glass (KG1 having 2 mm thickness) is often used as a thermal protection filter. The continuous spectrum of the resulting illumination makes a reliable colour assessment by the user possible.

In the case of illumination with a particular light source, what is known as the colour rendering index (CRI) is of importance for assessing colours. This is understood to be a photometric value which can be used to describe the quality of the colour rendering of light sources of equal correlated colour temperature. Up to a colour temperature of 5000 K, the light be emitted from a black body of the corresponding colour temperature is used as a reference for assessing the rendering quality. Above a colour temperature of 5000 K, a daylight-like spectral distribution is used as a reference. For example, for calculating the colour rendering of a household filament bulb, which is itself a good approximation to a black body, the spectrum of a black body having a temperature of 2700 K is used. Any light source which perfectly imitates the spectrum of a black body of equal (correlated) colour temperature in the range of the visible wavelengths achieves a colour rendering index of 100. Halogen lamps, similarly to filament bulbs, can achieve colour rendering indices of up to 100.

In microscopy, the halogen lamp is increasingly being replaced with light-emitting diodes (LEDs in the following), which have known advantages. These advantages include greater light radiation at a lower consumption of electrical power and a longer service life. For transmitted light illumination, white LEDs are predominantly used. In a white standard LED, a blue, violet or UV LED is combined with photoluminescent material. Use is generally made of a blue LED, which is combined with a yellow luminescent material. UV LEDs comprising a plurality of different luminescent materials (generally red, green and blue) may also be used. In accordance with the principles of additive colour mixing, white light is produced by LEDs of this type. The components manufactured in this manner have good colour rendering properties, the colour rendering indices being between 70 and 90. However, the white LEDs do not emit a continuous spectrum. White light LEDs which are based on blue LEDs have a strong emission in the blue spectral range (at approximately 450 nm), a minimum in the blue-green (at approximately 500 nm) and a wider emission range up to higher wavelengths, with a maximum at approximately 550 nm, which decreases considerably at approximately 650 nm.

Depending on the type of LED, the ratio of the intensity minimum at 500 nm to the intensity maximum at approximately 450 nm is typically approximately 10-20%. With a discontinuous spectrum of this type as the sample illumination, the colour assessment is more difficult, and differs from the empirical values obtained in the case of microscope illumination by means of a halogen lamp.

DE 10 2007 022 666 A1 addresses this problem. In this document, the illumination for microscopy from a conventional halogen light source, which is combined with a daylight filter, is compared with that of a white light LED. It is found that the colours of the observed object, which is observed either visually or by way of a (CCD) camera, are altered as a result of the different spectral distributions, and this colour alteration can lead to incorrect diagnostic results. In this document, it is therefore attempted to adapt the spectral distribution of a white light LED to the spectral distribution of daylight by means of a so-called "wavelength distribution conversion element". In this document, several examples of suitable spectral transmission profiles for possible correction filters ("wavelength distribution conversion elements") are provided, there being the possibility of placing two correction filters in succession. A first example of white light LEDs which are used therein exhibits a first maximum in the blue range (at approximately 450 nm) and a second, in this case higher maximum in the green-yellow range (at approximately 550 nm). By contrast, another example of a white light LED exhibits the spectral profile which was described above in the introduction to the description, in which the first maximum has a higher intensity than the second maximum. In both cases, the respective correction filter provides a spectral profile which still corresponds as a whole to the profile of the original white light LED, but in which the two maxima are adjusted to approximately the same intensity. The resulting spectral profile is thus still a long way away from the desired aim, which is a spectrum of daylight or of a halogen lamp (comprising a daylight filter).

A further problem occurs in fluorescence microscopy, which was addressed in the introduction above. If, in addition to the transmitted light bright field illumination which was discussed above, the microscope additionally has the possibility of incident light fluorescence illumination, the inventors found the following effect. A large proportion of the excitation light which is produced during the incident light fluorescence excitation of the sample passes through the sample and reaches the transmitted light illumination source along the transmitted light illumination axis. If a white light LED comprising a blue LED is arranged at this location, blue excitation light leads to excitation of the yellow-green conversion dye in the white LED, in such a way that, in turn, yellow-green light reaches the sample along the transmitted light illumination axis. This is perceived as a disruptive background in the fluorescence image, and can even overlap considerably with the actual fluorescence from the sample. Analogous effects are found when white light LEDs which are based on violet or UV LEDs are used, if the excitation light of the fluorescence illumination has spectral components in the violet or UV spectral range. In this case, the corresponding conversion dyes in the white light LED are excited. This excitation takes place even when the white light LED per se is switched off.

SUMMARY OF THE INVENTION

The object of the present invention is therefore to reduce disruptive light in the incident light fluorescence observation, in a microscope comprising transmitted light bright field illumination by means of a white light LED and incident light fluorescence illumination, which can be switched on alternately or simultaneously.

The invention proposes a method for illuminating a sample in a microscope, in which the sample can be illuminated alternately or simultaneously by transmitted light bright field illumination and by incident light fluorescence illumination, a white light LED being used as the light source for the transmitted light bright field illumination. Both in transmitted light bright field illumination and in incident light fluorescence illumination, a spectrally selective correction filter is activated at a location in the illumination beam path of the transmitted light bright field illumination. This correction filter has a spectral transmission profile which has a minimum in the wavelength range of at least one maximum of the spectrum of the white light LED.

Thus, according to the invention, both when the transmitted light bright field illumination means is switched on and when the incident light fluorescence illumination means is switched on, and also in the less commonly occurring case of combined transmitted light bright field illumination and simultaneous incident light fluorescence illumination, a spectral correction filter is introduced into the illumination beam path of the transmitted light bright field illumination means. It should be emphasised that the correction filter is introduced into the illumination beam path of the transmitted light bright field illumination even when the light source for the transmitted light illumination, that is to say the white light LED, is switched off. This accounts for the wording that the correction filter is activated "at a location in the illumination beam path". The expression that the correction filter is arranged or activated on the transmitted light illumination axis is used synonymously with this. The term "activating" the correction filter should be interpreted to the effect that it also includes the permanent presence of this filter on the transmitted light illumination axis. However, it may be advantageous to apply the correction filter to a filter slide or filter wheel, which removes the spectral correction filter from the transmitted light illumination axis and brings possible other filters into the beam path for other microscopy methods, in particular contrast methods, which were discussed at the outset. Thus, the spectral correction filter is or can be arranged between the sample and the white light LED on the transmitted light illumination axis.

It should be noted that the spectral correction filter is not necessarily a single filter but can comprise two or more spectral filters, the combination of said two or more spectral filters forming the spectral correction filter.

It should further be noted that the spectral correction filter can comprise an electronic filter, like a transmissive display.

In the present invention, the spectral correction filter has a spectral transmission profile which has a transmission minimum in the wavelength range of at least one maximum of the spectrum of the white light LED. Without loss of generality, the present invention will be explained by way of a type of white light LED of the kind described at the outset, in which the white light LED which is excited with blue light has a spectrum which has a maximum in the blue wavelength range (at approximately 450 nm), a minimum in the blue-green (at approximately 500 nm) and a further maximum in the green-yellow wavelength range (at approximately 650 nm). However, the principle behind the present invention is not limited to this type of white light LED, but can also be applied in the case of other types of white light LED.

According to the present invention, the spectral correction filter which is tuned to the white light LED reduces radiation from the spectral range of the white light LED which—to keep to the aforementioned example—originates from the blue and/or green-yellow wavelength range. On the one hand, this has a favourable effect on the transmitted light bright field illumination, since in this way the intensity of the transmitted radiation is reduced in the range of one or more spectral maxima, and as a result an approximation to the spectrum of a halogen lamp, in particular comprising an upstream thermal protection filter and/or daylight filter, can be achieved, or with corresponding further configuration of the correction filter, complete correspondence with said spectrum can be achieved. On the other hand, in the case of incident light fluorescence illumination, the invention can reduce or completely eliminate the undesirable effect which was mentioned at the outset. If the spectral transmission profile of the correction filter has a transmission minimum in the blue wavelength range for example, the correction filter can prevent blue excitation light from the incident light fluorescence illumination from impinging on the white light LED which is provided for transmitted light. As was stated previously at the outset, specifically a large fraction of the blue excitation light passes through the sample along the transmitted light illumination axis to the white light LED. The spectral correction filter which is arranged on the transmitted light illumination axis thus prevents the excitation of the yellow-green conversion dye in the white light LED. If the correction filter has a spectral transmission profile which has a transmission minimum in the yellow-green wavelength range for example, the correction filter which is applied on the transmitted light illumination axis can in turn prevent yellow-green light, which is produced by excitation of the yellow-green conversion dye by blue excitation light from the white light LED, from reaching the sample.

Therefore, in a particularly advantageous configuration, a correction filter is used which has transmission minima in the wavelength ranges of all of the maxima of the spectrum of the white light LED, that is to say in the present example transmission minima in the blue and in the yellow-green wavelength ranges. It should again be emphasised that the effect of the excitation of the yellow-green conversion dye, by blue excitation light from the incident light fluorescence illumination, still occurs when the white light LED is switched off, that is to say when the transmitted light illumination means is switched off.

The invention is thus ideally suited on the one hand for correcting the spectral profile of the transmitted light illumination comprising a white light LED to the spectral profile of a halogen lamp with or without a daylight filter or a thermal protection filter, and simultaneously, after switching to incident light fluorescence illumination, for eliminating the disruptive intensity background in the fluorescence image, which originates from the excitation of dyes in the transmitted light white light LED by means of excitation light from the incident light fluorescence illumination. The white light LED, which is generally switched off, is then excited and irradiates the fluorescing sample from below.

The invention can in particular always be used particularly advantageously if the spectrum of the excitation light of the incident light fluorescence illumination which reaches the sample has components which (can) serve to excite of a conversion dye which is present in the white light LED. Specifically, it is in precisely this case that the effect occurs whereby conversion dyes are excited by excitation light from the fluorescence illumination even if the white light LED is switched off.

The requirement that the correction filter should have a spectral transmission profile which has a minimum (or a maximum) in the "wavelength range" of a maximum (or a minimum) of the spectrum of the white light LED should be understood to the effect that this minimum (or maximum) is in a range of ±25 nm about the maximum (or minimum). Depending on the sharpness of peak of the maximum (or minimum) said range can be less, down to ±10 nm or even less than ±10 nm. In particular, however, the transmission profile of the correction filter is designed in such a way that the aforementioned positive effects occur both during transmitted light bright field illumination and during incident light fluorescence illumination.

Purely for completeness, it should be noted that an alternative to the invention which is discussed herein involves introducing a shutter into the transmitted light illumination axis during incident light fluorescence illumination, which shutter keeps excitation light, which passes through the sample in the direction of the transmitted light illumination axis, completely away from the white light LED. Upon switching to transmitted light bright field illumination, the shutter has to be removed from the transmitted light illumination beam path again.

The present invention is also suited in particular for use with other microscopy methods, such as the contrast methods which were addressed at the outset. In phase contrast ("phaco"), only approximately 10% of the light from the light ring is transmitted towards the sample. In differential interference contrast ("DIC"), crossed polarisers receive the majority of the light intensity. Finally, when the probe is viewed in a dark field, no direct light is observed, but only light which is scattered on the sample. Since the illumination systems in microscopes are generally configured in such a way that sufficient light is also available for the stated contrast methods, the intensity of the transmitted light illumination is high enough that attenuation by the additional correction filter which is used according to the invention does not lead to intensity problems, but is actually suited for intensity correction.

When the present invention is used together with contrast methods, it is expedient, upon leaving the transmitted light bright field illumination and upon switching to a contrast method, to remove the correction filter from the illumination beam path of the transmitted light bright field illumination (manually or automatically), in such a way that a higher light intensity is available again for the selected contrast method.

As well as the aforementioned method for microscope illumination, the invention relates to a microscope illumination means, comprising a white light LED and a correction filter which is tuned to the white light LED, to the use of a microscope illumination means of this type and finally to a corresponding microscope. All of the configurations relating to one of these aspects of the present invention are each intended to apply to all of the other aspects.

The microscope illumination means according to the invention is particularly preferably suited for transmitted light illumination of a sample in a microscope, this sample in particular being analysed alternately or simultaneously in transmitted light bright field illumination and in incident light fluorescence illumination. In this context, a white light LED is used as the light source for the transmitted light bright field illumination, and the spectral correction filter is activated at a location in the illumination beam path of the transmitted light bright field illumination both during transmitted light bright field illumination and during incident light fluorescence illumination. The spectrum of the white light LED has at least two maxima. The transmission profile of the correction filter is tuned to the white light LED and has a transmission minimum in the wavelength range of at least one of these intensity maxima of the LED. A preferred application scenario is the previously discussed white light LED type having two maxima which are in the blue and green-yellow wavelength ranges, it being possible to limit these ranges to the ranges of 440 to 470 nm (blue range) and 520 to 570 nm (green-yellow range) respectively.

A microscope illumination means which is configured in this manner offers the previously discussed advantages during alternating (or simultaneous) transmitted light bright field illumination and incident light fluorescence illumination. Although the spectral profile of a white light LED was briefly described qualitatively above, there are clear differences between different white light LEDs of the same type in terms of the exact position of the peaks (maxima) in the blue and green-yellow wavelength ranges and the amplitudes thereof. This also applies to the position and amplitude of the minimum which is between the two maxima in the range between 470 nm and 520 nm, in particular at approximately 500 nm. For optimal adaptation of the correction filter to the white light LED, precise knowledge of the emission profile, that is to say the spectrum of the white light LED, is important.

Preferably, the spectral transmission profile of the correction filter has a transmission maximum in the wavelength range of a minimum of the spectrum of the white light LED. Optimally, the spectral transmission profile is tuned to the white light LED in such a way that the spectrum of the transmitted light bright field illumination which impinges on the sample corresponds to that of a halogen lamp. For optical viewing, it is sufficient for this spectrum to correspond to the spectrum of a halogen lamp at least in a predominant part of the visible wavelength range. The predominant part of the visible wavelength range extends in particular from 420 to 700 nm.

Depending on the application scenario, correspondence with the spectrum of a halogen lamp having an upstream daylight filter and/or thermal protection filter may also be provided. In connection with a halogen lamp, a thermal protection filter should eliminate the undesirable IR component thereof in the spectrum insofar as possible. A typical thermal protection filter consists of 2 mm KG1 glass from Schott having the following spectral profile: in the visible range from approximately 400 nm to approximately 600 nm, the transmission is virtually constant (at just under 90%); above 600 nm, light is increasingly absorbed; at 700 nm, the transmissivity is only 60%, and at 800 nm it is already less than 30%. By contrast, a daylight filter is effective primarily in the visible spectral range, and is intended to "shift" the colour temperature of the halogen lamp for example from 3200 K to a daylight-like colour temperature of approximately 5500 K. Accordingly, a filter of this type is also referred to as a conversion filter. The typical spectrum of a filter of this type is approximately inversely exponential, having a maximum at 400 nm (100% transmission), and subsequently dying away at higher wavelengths (40% transmission at 500 nm, 20% transmission at 600 nm, 10% transmission at 800 nm).

In practice, the spectral emission of the white light LED which is used is initially precisely determined for example by means of a suitable spectrometer. A correction filter is designed and produced so as to be adapted thereto. In this context, there is the advantage that the LED manufacturer can calibrate the LEDs after production and place them in what are known as "colour ranks". If relatively large numbers of LEDs are required, the manufacturer provides these attached to a strip, each strip only comprising LEDs of one colour rank. Thus, to produce the microscope illumination set according to the invention it is not necessary to design and produce a different filter for each LED, but only for all of the LEDs of one strip. This greatly reduces the logistical complexity.

Details on the spectral profiles of white light LEDs and suitable transmission profiles for correction filters may be derived from the embodiments which are discussed below.

Finally, the invention also relates to a microscope for analysing a sample alternately or simultaneously in transmitted light bright field illumination and in incident light fluorescence illumination, the microscope comprising a transmission light bright field illumination means and an incident light fluorescence illumination means, a white light LED being provided as the light source for the transmitted light bright field illumination means, and it being possible to activate a correction filter at a location in the illumination beam path of the transmitted light bright field illumination means both during transmitted light bright field illumination and during incident light fluorescence illumination. The correction filter has a spectral transmission profile which has a transmission minimum in the wavelength range of at least one maximum of the spectrum of the white light LED.

Further configurations of a microscope system of this type, in particular of the correction filter which is used therein, may be derived from the above statements regarding the invention.

A configuration of the microscope is particularly preferred in which the spectrum of the white light LED of the transmitted light bright field illumination means has at least two maxima, which are in particular in the blue and green-yellow wavelength ranges respectively, the spectral transmission profile of the correction filter having a transmission minimum in the wavelength range of at least one of these maxima, and the spectrum of the white light LED having at least one minimum which is between the at least two maxima, the spectral transmission profile of the correction filter having a transmission maximum in the wavelength range of this at least one minimum. For the advantages of this configuration, reference should be made to the corresponding statements above.

A configuration which is particularly suitable for the microscopic observation and analysis of samples is achieved when the spectral transmission profile of the correction filter is tuned to the spectrum of the white light LED in such a way that the relative spectral profile which is transmitted through the correction filter corresponds to the spectrum of a halogen lamp, in particular comprising an upstream thermal protection filter and/or daylight filter, at least in the predominant part of the visible wavelength range. In practice, this predominant part of the visible wavelength range extends in particular from 420 nm to 700 nm. For further advantages of this configuration, reference should be made to the corresponding statements above.

It is expedient in particular to use a white light LED of which the spectrum has two maxima, which are in the ranges from 440 nm to 470 nm and from 520 nm to 570 nm respectively. Finally, it is favourable to use a white light LED of which the spectrum has a minimum which is in a range between 470 nm and 520 nm, in particular at 500 nm White light LEDs of this type were initially associated with the type of white light LEDs which are excited by means of blue light. In particular in relation to this type of white light LED, correction filters can be designed which greatly reduce the disruptive light which is produced by fluorescence excitation and which can also closely approximate the spectrum of the transmitted light illumination to that of a halogen lamp (in particular comprising a thermal protection filter).

It goes without saying that the above-mentioned features and those which are to be described in the following can be used not only in the respectively stated combinations, but also in other combinations or in isolation, without departing from the scope of the present invention.

The invention is shown schematically in the drawings by way of an embodiment, and is described in detail in the following with reference to the drawings.

DETAILED DESCRIPTION OF THE PREFERRED EMBODIMENTS

Figure 1:
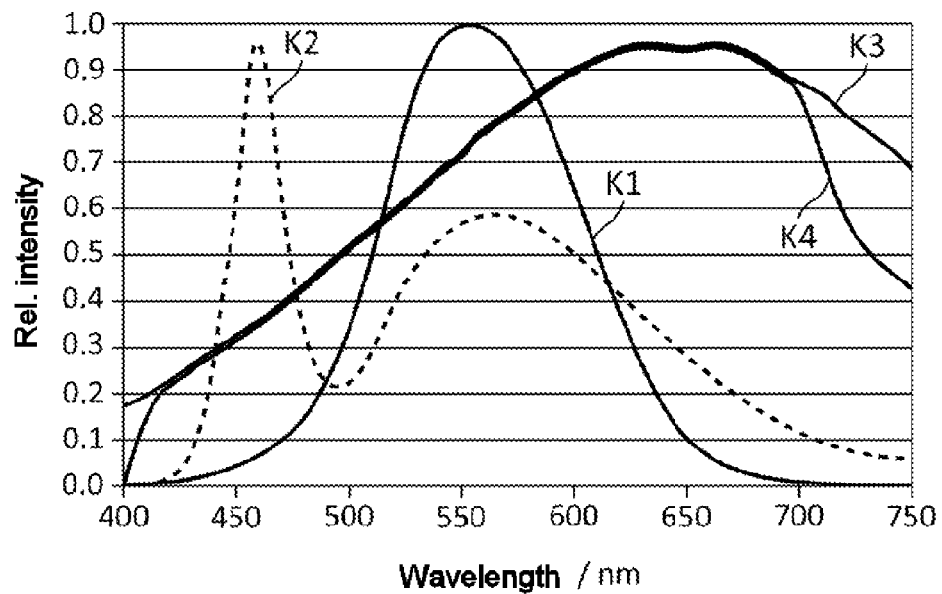
FIG. 1 shows, along with an eye sensitivity curve (K1), the spectrum (K2) of a white light LED, the spectrum (K3) of a halogen lamp comprising a thermal protection filter, and the corrected spectrum (K4) of a white light LED.

FIG. 1 shows schematically four different curves K1 to K4 of relative intensity against wavelength (in nanometers). The intensities shown are normalised to 1.0. The wavelength range shown covers 400-750 nm, and thus the visible wavelength range from violet through blue, green, yellow, orange and red.

The curve K1 represents the eye sensitivity curve, having the highest sensitivity thereof in the wavelength range around 550 nm (green-yellow) and having a profile which decays in a bell shape on either side of the maximum towards higher and lower wavelengths. It will be noted that below approximately 420 nm (violet-blue) and above approximately 700 nm (red) the eye becomes very insensitive, that is to say perception of colours barely remains possible for the human eye outside the range between 420 nm and 700 nm. Therefore, for optical viewing of microscopically analysed samples, colour correction in the spectral range between 420 nm and 700 nm is sufficient.

The dashed curve K2 shows the typical spectral profile of a white light LED, which emits in the blue wavelength range and excites a conversion dye to glow in the green-yellow spectral range. Accordingly, the first maximum is in the blue wavelength range at approximately 450-460 nm and the second maximum is in the green-yellow spectral range at approximately 550-560 nm. It will be noted that the range of the second maximum is wider than that of the first maximum. Between these maxima there is a minimum at approximately 500 nm. For different white light LEDs of the same type (in this case blue LED comprising conversion dye), the position and level of the maxima and minima of the spectral profile may be different. LEDs having corresponding maxima and minima in the spectral profile are assigned by the manufacturers to a particular colour rank.

The curve K3 shows the relative spectral profile of a halogen lamp comprising a thermal protection filter. A maximum will be noted at approximately 650 nm (red). In the rising range up to approximately 600 nm, the curve K3 is determined by the emission of a black body. The curve flattens off at above 600 nm, and falls again after reaching the maximum at about 650 nm. This is caused by the additional thermal protection filter.

Within the range from approximately 420 nm to 700 nm, the curve denoted as K4 substantially corresponds to the profile of the curve K3, but outside this range there is a large decrease in intensity. The curve K4 can be produced by placing a correction filter, having a transmission profile as shown in FIG. 2, upstream from a white light LED having a spectral profile in accordance with the curve K2.

Figure 2:
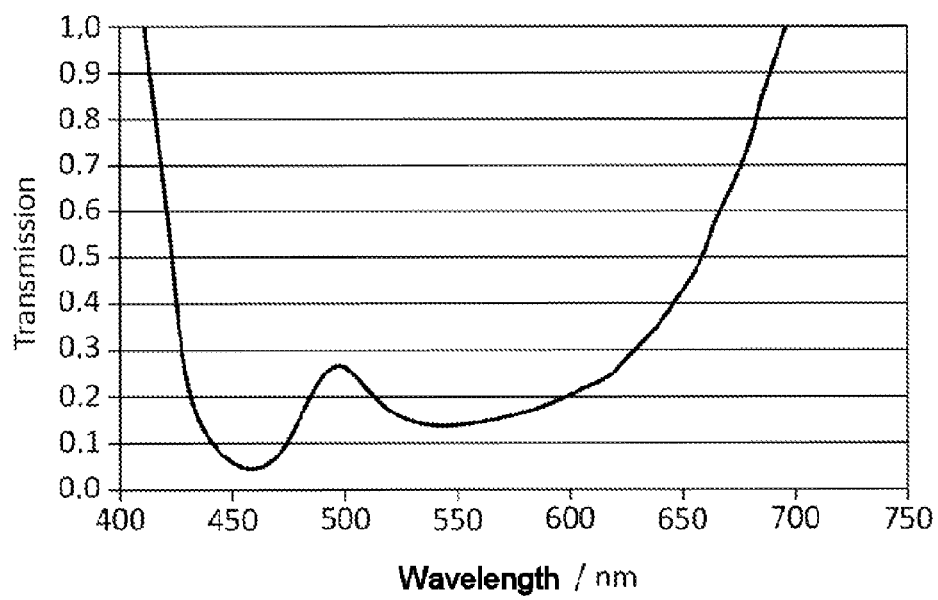
FIG. 2 shows the transmission profile of a correction filter for correcting the spectrum of a white light LED.

FIG. 2 clearly shows the position of the minima and maxima of the transmission profile of a particularly suitable correction filter. In this case, the transmission is specified using values between 0 and 1, corresponding to complete absorption at 0 and complete transmission at 1.0. The wavelength range shown corresponds to that of FIG. 1. The transmission profile of the correction filter shows a first transmission minimum at approximately 450-460 nm, approximately at the point at which the curve K2 has the first maximum thereof. The second transmission minimum of the transmission curve is at approximately 550 nm, that is to say in a range in which the curve K2 has the second maximum thereof (at 550-560 nm). "Range" should be taken to mean a range of ±25 nm about a particular value. It will be noted that the position of a maximum in the spectral curve K2 and of a transmission minimum in the transmission profile of the filter need not correspond exactly. Between the two transmission minima in the transmission profile of the correction filter, there is a transmission maximum at approximately 500 nm. This transmission maximum is within a few nanometers of the minimum in the spectral profile of the curve K2.

The transmission profile according to FIG. 2 provides that the light of a white light LED having the spectrum K2 according to FIG. 1, which is transmitted through the correction filter, has a spectral profile similar to a conventional halogen lamp comprising a thermal protection filter. Thus, a correction filter of this type is optimal for a microscopic analysis of a sample in the transmitted light bright field, without the viewer perceiving any differences from conventional microscope illumination by means of halogen lamps. At this point it should be noted that corresponding correction filters, for observation by means of cameras, can also be designed in the described manner. The aim in this case would thus be for the camera image, in microscope illumination by means of a white light LED, to evoke the closest possible impression to microscope illumination by means of a conventional halogen lamp (optionally comprising a thermal protection filter and/or a daylight filter). However, this application scenario is less critical, since a disruptive background can be eliminated by means of the (often automatic) white balance of the camera.

By way of the described filtering of the white light LED light which is used in transmitted light, the intensity of the transmitted light which is incident on the sample is of course reduced as a whole. For the filtering shown in FIG. 2, this corresponds overall to a reduction of the LED intensity by a factor of 5. However, since sufficient intensity is available in transmitted light illumination, this reduction is not a problem. However, for possible contrast methods which are described in the following, the correction filter has to be deactivated, so as still to be able to provide sufficient transmitted light in this context.

The details of the operation of the correction filter having a transmission profile according to FIG. 2 are as follows. The correction filter significantly reduces the background, described in detail above, during incident light fluorescence illumination as a result of the undesired fluorescence excitation of the conversion dye of the white light LED. When this filter is pivoted in during incident light fluorescence illumination, during fluorescence excitation of the sample by means of blue light (BP 470/40), that is to say for example between 450 nm and 490 nm, this blue light is initially reduced by a factor of about 10 (cf. first transmission minimum of the transmission profile according to FIG. 2) on the path through the sample to the white light LED of the transmitted light illumination means, since the average transmission of the filter in this wavelength range is approximately 10%. At the same time, however, the undesired yellow-green light which still occurs in the conversion layer of the white light LED is reduced at least by a factor of 5 (transmission of the filter in this wavelength range less than 20%) on the path thereof from the LED back to the sample. Overall, the intensity of the disruptive background is thus reduced by a factor of at least 50. Thus, in spite of the presence of a transmitted light illumination means comprising a white light LED, fluorescence analysis of the sample can be carried out, without having to place a shutter on the transmitted light illumination axis or having to remove the white light LED entirely, and without having to accept disruptive background illumination of the sample. At the same time, the transmission profile of the correction filter according to FIG. 2 produces sample illumination in the transmitted light bright field having the spectral profile according to the curve K4 from FIG. 1.

Figure 3:
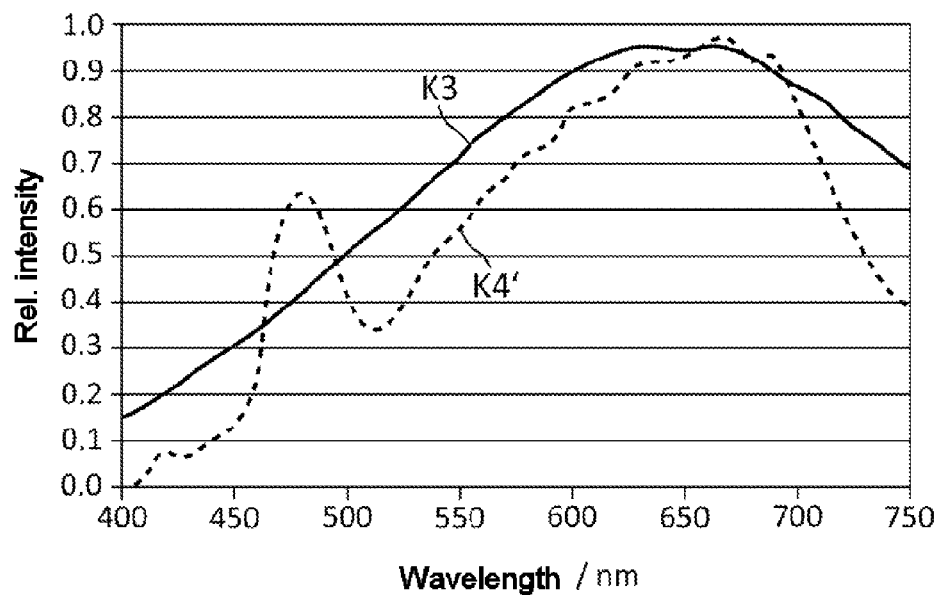
FIG. 3 shows the example of an incorrectly corrected spectrum (K4') of a white light LED.

It should be noted that exact coordination of the white light LED and correction filter is of the utmost importance for the advantages which are to be achieved by means of the invention, as is shown in FIG. 3. In FIG. 3, the relative intensity profile K4' is shown in the case where the correction filter of FIG. 2 is used with a white light LED of which the spectrum is shifted by merely 10 nm from the spectrum K2 of FIG. 1. Since the maximum at approximately 450 nm and the minimum at approximately 500 nm are very pronounced, high levels of spectral interference occur in these regions if the LED and the filter do not match one another. Thus, the correction to the spectral profile of a halogen lamp comprising a thermal protection filter (curve K3) can only be provided in an optimum manner if the correction filter is tuned precisely to the respective white light LED.

Figure 4:
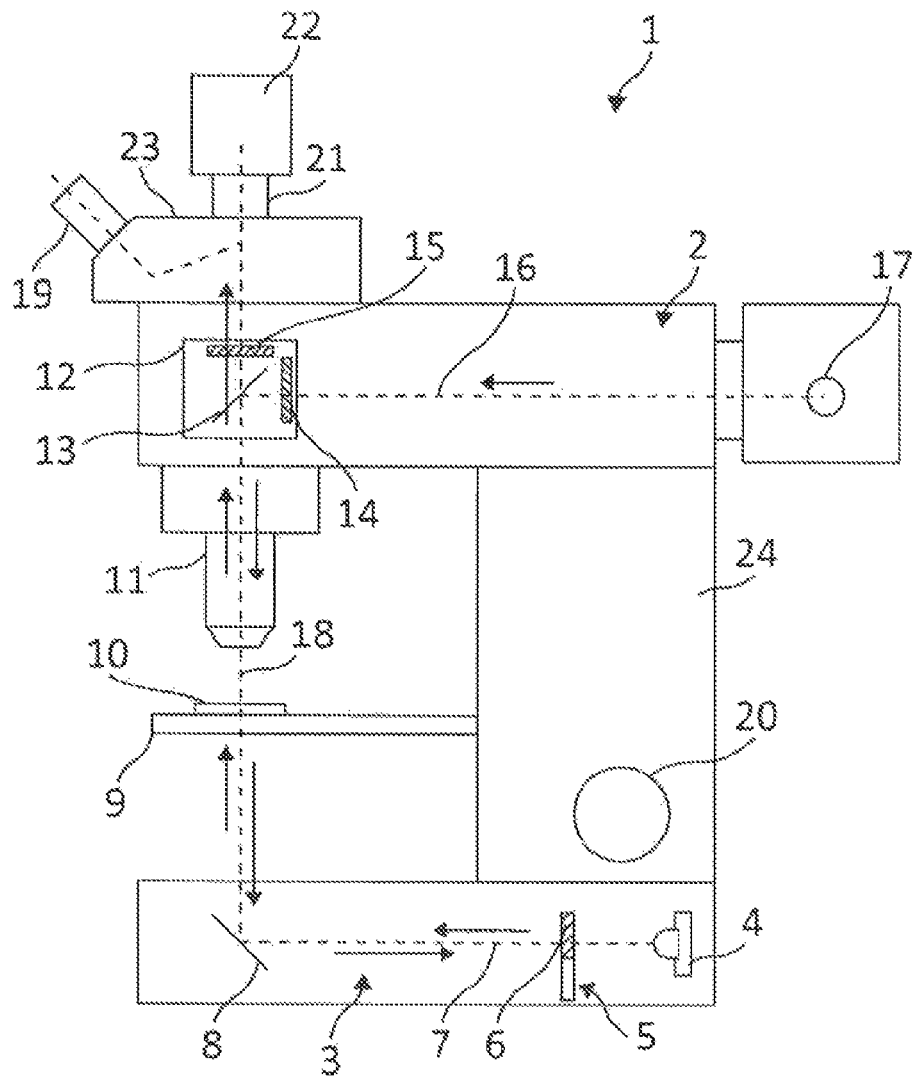
FIG. 4 is a schematic view of a microscope.

FIG. 4 is a schematic view of a microscope 1 along with the main components thereof, it being possible to operate the microscope 1 so as to analyse a sample 10 by incident light fluorescence illumination and/or in transmitted light bright field illumination.

The incident light fluorescence illumination means 2 comprises the following components: an incident light illumination light source 17, for example a mercury vapour lamp, and a fluorescence filter block 12, which are arranged on the incident light illumination axis 16. The fluorescence filter block 12 comprises a spectral excitation filter 14, which is followed, in the propagation direction of the incident illumination light, by a beam splitter 13. The excitation filter 14 is used for spectral selection of one or more wavelength ranges which are suitable for exciting fluorescences in the sample 10. The beam splitter 13 deflects the excitation light which is transmitted through the filter 14 towards the sample 10. A blocking filter 15 is further provided in the fluorescence filter block 12. The blocking filter 15 ensures that only the (green) fluorescence light which is emitted by the sample reaches the viewer, and thus blocks the excitation light.

The transmitted light bright field illumination means 3 comprises a white light LED 4 as a light source, followed by a filter slide 5 comprising a spectral correction filter 6 (shown shaded in) on the transmitted light illumination axis 7. The light which is transmitted through the spectral correction filter 6 reaches the deflection mirror 8 of the transmitted light bright field illumination means 3. In both illumination means 2 and 3, for clarity, any illumination optics such as lenses are not shown, since they are not relevant to the present discussion.

Further known conventional components of a microscope 1 include the microscope table 9 along with the sample 10 which is arranged thereon, the microscope table 9 being adjustable in the z direction, that is to say parallel to the optical axis 18, for focussing purposes, by means of a focussing knob 20 which is provided on the stand 24 of the microscope 1. A microscope objective lens 11, the microscope lens tube 23 and an eye-piece 19 are further shown, and finally a camera port 21 with a camera 22 connected. The objective lens 11 may be a component of an objective lens turret, which carries a plurality of different objective lenses. The lens tube 23 comprises, in the interior thereof, deflection prisms (not shown for clarity) which serve to deflect the imaging beam path of the microscope 1 to the viewer and to the camera 22.

The incident light illumination beam path which is produced by the incident light fluorescence illumination means 2 has an axis 16 and propagates along the arrows which are shown in FIG. 4. Said path initially passes through the excitation filter 14, so as to be deflected towards the sample 10 by the beam splitter 13. Fluorescences are excited in the sample, but the majority of the excitation light actually passes through the sample 10 and propagates along the transmitted light illumination axis 7 into the transmitted light bright field illumination means 3. Via the deflection mirror 8, the excitation light reaches the correction filter 6 (or more generally the position of the filter slide 5), from which it continues to the white light LED 4. For example, blue excitation light (450 nm to 490 nm) reaches the white light LED 4 on this path. This blue excitation light is extremely well suited for exciting the conversion dye in the white light LED, causing said dye to emit light in the yellow-green range. This light (again shown by arrows) propagates along the transmitted light illumination axis 7 towards the deflection mirror 8, from which it continues to the sample 10. The yellow-green light continues from the sample 10, via the objective lens 11, to the fluorescence filter block 12, and can pass through the blocking filter 15 and thus reach the eye-piece 19 or the camera 22. Without counter measures, this effect becomes noticeable in a highly disruptive manner as a yellow-green background in the fluorescence image.

As a result of the correction filter 6, which has the properties and advantages illustrated by way of FIGS. 1 to 3, it is possible to eliminate this disruptive background, and simultaneously to correct the light of the white light LED 4 to the conventional light of a halogen lamp comprising a thermal protection filter.

For this purpose, both in the case of fluorescence illumination and in the case of bright field illumination, the correction filter 6 is introduced onto the transmitted light illumination axis 7, that is to say into a location on the transmitted light illumination beam path, by means of the filter slide 5. Suppose that the transmission profile of the correction filter 6 is as shown in FIG. 2. As a result of the transmission minimum in the range 450-470 nm, the blue excitation light which has passed through the sample 10 cannot propagate onwards towards the white light LED 4, since it is mostly absorbed by the correction filter 6 (transmission level less than 10%). Remaining blue excitation light which is still transmitted is able to excite the conversion dye of the white light LED 4. Corresponding yellow-green light propagates in the direction of the transmitted light illumination axis 7 and impinges on the correction filter 6. As a result of the pronounced transmission minimum in the range 540-570 nm (transmission level less than 20%), this undesired yellow-green light is greatly reduced. As a result of the two effects, the disruptive yellow-green background is reduced by a factor of more than 50.

At the same time, the correction filter 6 is ideally suited for producing, in the transmitted light bright field illumination means 3 shown in FIG. 4, an illumination light for the sample 10 of which the spectrum coincides, at least in the significant range of the visible light, with that of a halogen lamp comprising a thermal protection filter (cf. curve K4 of FIG. 1). In transmitted light bright field illumination, the light source 17 of the incident light fluorescence illumination means 2 is conventionally switched off.

The previously discussed contrast methods can also be carried out by means of the microscope system 1 shown in FIG. 4. For this purpose, it is advisable to remove the correction filter 6, so as to be able to provide sufficient light intensity for the respective contrast method. With a suitable arrangement of the filter slide 5 on the transmitted light illumination axis 7, an empty position without any filter or another suitable optical element which is required for the respective contrast method can be introduced into the illumination beam path instead of the correction filter 6.

Figure 5:
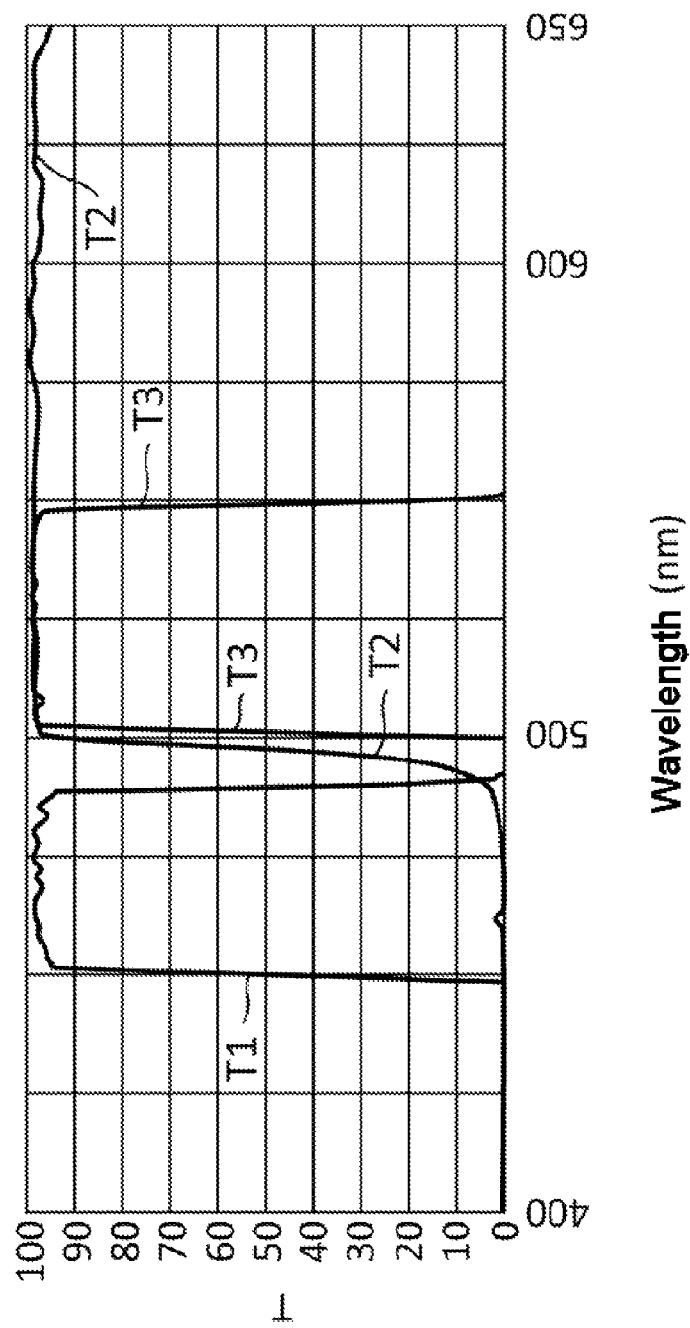
FIG. 5 shows transmission curves (T1 to T3) of a typical fluorescence filter.

FIG. 5 shows the spectral transmission profile of a typical fluorescence filter for the green FITC emission of a compound which is stained with appropriate dye and is excited by means of blue light between 450 nm and 490 nm. The transmission curve T1 shows the spectral transmission profile of the excitation filter ET 470/40x, which has a transmissivity of virtually 100% in the spectral range between 450 nm and 490 nm. This excitation filter constitutes for example the excitation filter 14 of FIG. 4. A comparison with FIG. 2 shows that in the range 450 nm to 490 nm of this excitation filter the correction filter has an average transmission of approximately 11%. Thus, excitation light which has passed through the sample is reduced approximately by a factor of 10.

The emission filter ET 525/50m which may be used as a blocking filter 15 has a transmissivity of virtually 100% in the range from 500 nm to 550 nm (cf. transmission curve T3). Thus, green light which is excited by fluorescence can pass through this filter. A comparison with FIG. 2 shows that the correction filter has an average transmission of approximately 18% in this range from 500 nm to 550 nm. Thus, overall, the disruptive background light from the conversion dye of the white light LED can be reduced approximately by a factor of 50. The curve T2 is associated with the dichromatic splitter 13 of FIG. 4. The dichromatic splitter 13 reflects the wavelengths which are allowed to pass through the excitation filter 14 towards the objective lens 11 or the sample 10. The fluorescence light which is emitted by the sample 10 is of a longer wavelength than the excitation light, and is allowed to pass through the dichromatic splitter 13 in the range of the transmission of the emission filter 15. Ideal dichromatic splitters 13 accordingly have no transmission in the range of the excitation wavelengths and maximum transmission in the range of the emission wavelengths.

LIST OF REFERENCE NUMERALS

1 Microscope
2 Incident light fluorescence illumination means
3 Transmitted light bright field illumination means
4 White light LED
5 Filter slide
6 Correction filter
7 Transmitted light illumination axis
8 Deflection mirror
9 Microscope table
10 Sample
11 Objective lens
12 Fluorescence filter block
13 Beam splitter
14 Excitation filter
15 Blocking filter
16 Incident light illumination axis
17 Incident light illumination light source
18 Optical axis
19 Eye-piece
20 Focussing knob
21 Camera port
22 Camera
23 Lens tube
24 Stand
K1-K4 Curves
T1-T3 Transmission curves

What is claimed is:

1. A method for illuminating a sample in a microscope, the method comprising:
    illuminating the sample alternately or simultaneously in transmitted light bright field illumination and in incident light fluorescence illumination;
    using a white light LED as a light source for the transmitted light bright field illumination, said white light LED comprising a conversion dye that emits yellow-green light when excited by blue light; and
    activating a correction filter in an illumination beam path of the transmitted light bright field illumination when the white light LED is turned OFF and a fluorescence source of the incident light fluorescence illumination is turned ON,
    wherein the correction filter absorbs blue light of the incident light fluorescence illumination to minimize transmission of the blue light to the white light LED, and the correction filter absorbs yellow-green light emitted from the conversion dye in response to receiving the minimized blue light of the incident light fluorescence illumination, thereby minimizing transmission of yellow-green light from the conversion dye.

2. The method according to claim 1, wherein the blue light is in a range of 450-470 nanometers and the yellow-green light is in a range of 540-570 nanometers.

3. The method according to claim 1, wherein the correction filter is a filter having a spectral transmission profile with minima in wavelength ranges of maxima of a spectrum of the white light LED.

4. The method according to claim 1, wherein the correction filter is a filter having a spectral transmission profile with transmission maxima in wavelength ranges of minima of a spectrum of the white light LED.

5. The method according to claim 1, wherein a spectral transmission profile of the correction filter is tuned to a spectrum of the white light LED, wherein a relative spectral profile transmitted through the correction filter corresponds to a spectrum of a halogen lamp comprising an upstream daylight filter or a thermal protection filter at least in a predominant part of a visible wavelength range.

6. An illumination system for a microscope, comprising:
    a white light LED source, which comprises a conversion dye that emits yellow-green light when excited by blue light, the white light LED source transmitting a light bright field illumination;
    an incident light source located along a path of the transmitted light bright field illumination; and
    a correction filter, activated when the white light LED is turned OFF and the incident light source is turned ON, which is tuned to the white light LED, wherein a spectrum of the white light LED comprises two maxima in blue and green-yellow wavelength ranges respectively, and wherein a spectral transmission profile of the correction filter comprises a transmission minimum in a wavelength range of at least one of these maxima, and wherein the correction filter blocks blue light of the incident light source from reaching the white light LED source, and blocks yellow-green light emitted from the conversion dye from passing through the filter.

7. The illumination system according to claim 6, wherein a spectral transmission profile of the correction filter is tuned to the spectrum of the white light LED wherein a relative spectral profile which is transmitted through the correction filter corresponds to a spectrum of a halogen lamp comprising an upstream thermal protection filter or a daylight filter at least in a predominant part of a visible wavelength range.

8. The illumination system according to claim 7, wherein the predominant part of the visible wavelength range extends from 420 nm to 700 nm.

9. The illumination system according to claim 6, wherein the two maxima are in a range from 440 to 470 nm and from 520 nm to 570 nm respectively, and the transmission minimum is in a range between 470 nm and 520 nm.

10. The illumination system according to claim 6, wherein the blue light is in a range of 440-470 nanometers and the yellow-green light is in a range of 520-570 nanometers.

11. A method of illuminating a sample with a microscope, comprising:
    providing a light bright field illumination from a white light LED and a correction filter tuned to the white light LED, wherein the white light LED comprises a conversion dye that emits yellow-green light when excited by blue light, and wherein the correction filter is located in a path of the light bright field illumination;
    providing incident fluorescence light illumination from a fluorescence source;
    illuminating a sample in the microscope with illumination from the white light LED having a spectrum comprising at least two maxima in blue and green-yellow wavelength ranges respectively, a spectral transmission profile of the correction filter having a minimum in the wavelength range of at least one of the two maxima; and
    analyzing the sample alternately or simultaneously in transmitted light bright field illumination and in incident light fluorescence illumination, wherein the correction filter is activated when the white light LED is turned OFF and the fluorescence source is turned ON.

12. A microscope for analyzing a sample, the microscope comprising:
   a white light LED source, which comprises a conversion dye that emits yellow-green light when excited by blue light, for providing transmitted light bright field illumination and an incident light source for providing incident light fluorescence illumination to be switched on alternately or simultaneously; and
   a spectral correction filter located on an illumination beam path of the transmitted light bright field illumination, activated when both the white light LED source is turned OFF and the incident light source is turned ON,
   wherein the correction filter comprises a spectral transmission profile which blocks blue light of the incident light fluorescence illumination from reaching the white light LED source, and blocks yellow-green light emitted from the conversion dye from passing through the filter.

13. The microscope according to claim 12, wherein a spectrum of the white light LED comprises at least two maxima in the blue and green-yellow wavelength ranges respectively, and wherein a spectral transmission profile of the correction filter comprises a transmission minimum in wavelength range of at least one of these maxima, and wherein the spectrum of the white light LED comprises at least one minimum between the at least two maxima, and the spectral transmission profile of the correction filter comprises a transmission maximum in a wavelength range of the at least one minimum.

14. The microscope according to claim 12, wherein a spectral transmission profile of the correction filter is tuned to a spectrum of the white light LED wherein a relative spectral profile transmitted through the correction filter corresponds to a spectrum of a halogen lamp at least in a predominant part of a visible wavelength range.

15. The microscope according to claim 12, wherein the relative spectral profile transmitted through the correction filter corresponds to the spectrum of the halogen lamp comprising an upstream thermal protection filter or a daylight filter at least in the predominant part of the visible wavelength range.

16. The microscope according to claim 14, wherein the predominant part of the visible wavelength range extends from 420 nm to 700 nm.

17. The microscope according to claim 12, wherein the blue light is in a range of 440 nm to 470 nm and the yellow-green light is in a range from 520 nm to 570 nm.

18. The microscope according to claim 12, wherein a spectrum of the white light LED comprises a minimum which is in a range between 470 nm and 520 nm.

* * * * *